(12) United States Patent
Husemann et al.

(10) Patent No.: US 6,875,506 B2
(45) Date of Patent: Apr. 5, 2005

(54) THERMALLY CROSSLINKED ACRYLIC HOTMELTS

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 149 days.

(21) Appl. No.: 09/778,165

(22) Filed: Feb. 7, 2001

(65) Prior Publication Data

US 2001/0024764 A1 Sep. 27, 2001

(30) Foreign Application Priority Data

Feb. 25, 2000 (DE) .......................................... 100 08 841

(51) Int. Cl.[7] ....................... B32B 133/04; C08G 18/62; C08G 59/22
(52) U.S. Cl. ....................... 428/345; 428/343; 428/349; 428/355 RA; 428/355 AC; 522/126; 522/129
(58) Field of Search ................................ 428/343, 345, 428/349, 355 RA, 355 CA; 522/126, 129, 111, 109; 430/270.1, 280.1; 435/232.1, 376.1; 525/187, 185, 190, 377, 385; 528/444, 48

(56) References Cited

U.S. PATENT DOCUMENTS

| | | | | |
|---|---|---|---|---|
| 3,765,972 A | * | 10/1973 | Wesp | .......................... 156/330 |
| 4,128,600 A | * | 12/1978 | Skinner et al. | .............. 525/123 |
| 5,194,455 A | | 3/1993 | Massow et al. | |
| 5,340,946 A | * | 8/1994 | Friedrich et al. | ........... 174/256 |
| 5,721,289 A | * | 2/1998 | Karim et al. | .................. 522/31 |
| 5,879,852 A | * | 3/1999 | Eichhorn et al. | ........... 430/157 |
| 6,045,968 A | * | 4/2000 | Ushirogouchi et al. | .. 430/270.1 |

FOREIGN PATENT DOCUMENTS

| | | |
|---|---|---|
| DE | 2 131 059 | 12/1972 |
| DE | 43 16 317 A1 | 11/1994 |
| JP | 5-17726 | 9/1993 |

OTHER PUBLICATIONS

English Abstract of JP 5–17726.
English Abstract of DE 2 131 059.
English Abstract of DE 43 16 317.

* cited by examiner

Primary Examiner—Susan Berman
(74) Attorney, Agent, or Firm—Norris McLaughlin & Marcus PA

(57) ABSTRACT

Polyacrylates obtainable by thermal crosslinking of a polymer mixture comprising the following components:

a) a polyacrylate copolymer of the following monomers
  a1) acrylates and/or methacrylates of the following formula $CH_2=CH(R^1)(COOR^2)$, where $R^2=H$ or $CH_3$ and $R^2$ is an alkyl chain with 1–20 carbon atoms,
  at 65–99% by weight, based on a),
  a2) olefinically unsaturated monomers containing functional groups,
  at 0–15% by weight, based on a),
  a3) acrylates and/or methacrylates whose alcohol component contains tert-butoxycarbonyl (BOC) and/or hydroxyl groups,
  at 1–20% by weight, based on a),
  at 80–99.8% by weight, based on the polymer mixture,
b) a polymerization regulating photoinitiator at 0.1–15% by weight, based on the polymer mixture,
c) difunctional isocyanate and/or difunctional epoxide at 0.1–5% by weight, based on the polymer mixture.

10 Claims, 3 Drawing Sheets

THERMALLY CROSSLINKED ACRYLIC HOTMELTS

The invention relates to polyacrylates crosslinked by thermal treatment, to a process for their preparation, and to their use.

The technological process of preparing pressure-sensitive adhesive compositions is subject to continual ongoing development. In the industry, hotmelt processes with solventless coating technology are of growing importance in the preparation of pressure-sensitive adhesive compositions. This development is being pressed further by evermore stringent environmental regulations, and increasing prices for solvents. Consequently, there is a desire to eliminate solvents as far as possible from the manufacturing process for pressure-sensitive adhesive tapes. The introduction of the hotmelt technology imposes growing requirements on the adhesive compositions. Acrylic pressure-sensitive adhesive (PSA) compositions are a subject of very intensive investigations aimed at improvements. For high-level industrial applications, polyacrylates are preferred on account of their transparency and weathering stability. Besides these advantages, however, the acrylic PSA compositions must also meet stringent requirements in respect of shear strength. This is achieved by means of polyacrylates of high molecular weight and high polarity, with subsequent efficient crosslinking. Efficient crosslinking is obtained most easily by means of metal chelates, which at elevated temperatures react with carboxylic acid functions and so crosslink the acrylic PSA composition. This method is state of the art for solventborne PSA compositions.

An alternative option is to use polyfunctional isocyanates. For hotmelt processes, however, these methods are unsuitable, since the PSA compositions are processed at high temperatures and would therefore crosslink, and thus form a gel, while still in the course of processing. After crosslinking, such PSA compositions are no longer coatable.

For hotmelt processes, preference is given to electron beam curing (EB curing or EBC) since it enables even fairly thick films to be crosslinked. Electron beam curing requires no thermal energy, and crosslinking takes place in a relatively short time.

The first EB curing polyacrylate hotmelts were described in DE 21 31 059 A1. Further EB curing hotmelts were developed in JP 05017726. U.S. Pat. No. 5,194,455 described the addition of N-tert-butylacrylamide monomer in order to force forward the EB curing.

A general disadvantage of the EBC is the backing damage. The electron beams penetrate not only the adhesive composition but also the backing material or the release paper. As a result, damage occurs which is manifested in instances of discoloration or in high unwind forces for the adhesive tape. The need is therefore for a hotmelt PSA crosslinking method which is both efficient and gentle to the backing.

It is an object of the invention, therefore, to offer a polymer mixture which allows such gentle crosslinking, but where the crosslinking process does not ensue during the early processing stage when employing the solventless production technique. At the same time, there should be no damage to the backing nor restriction on its use for an adhesive tape.

This object is achieved by means of a polyacrylate as described herein. Further embodiments of the invention relate to advantageous developments of the polyacrylate, processes for its preparation, and the use of the polyacrylates.

The invention is outstandingly suitable for fulfilling the object as described by virtue of the fact that it is possible to carry out such a gentle crosslinking with the polymer mixture described. The invention accordingly provides polyacrylates obtainable by thermal crosslinking of a polymer mixture comprising the following components:

a) a polyacrylate copolymer of the following monomers
  a1) acrylates and/or methacrylates of the following formula

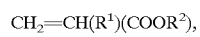

$CH_2=CH(R^1)(COOR^2)$, where $R^2=H$ or $CH_3$ and $R^2$ is an alkyl chain with 1–20 carbon atoms, at 65–99% by weight, based on a),
  a2) olefinically unsaturated monomers containing functional groups, at 0–15% by weight, based on a),
  a3) acrylates and/or methacrylates whose alcohol component contains tert-butoxycarbonyl (BOC) and/or hydroxyl groups, at 1–20% by weight, based on a), at 85–99.8% by weight, based on the polymer mixture,
b) a polymerization regulating photoinitiator at 0.1–10% by weight, in particular at 0.5–1% by weight, based on the polymer mixture,
c) difunctional isocyanate and/or difunctional epoxide at 0.1–5% by weight, in particular at 0.5–1% by weight, based on the polymer mixture.

The invention additionally provides a process for preparing crosslinked polyacrylates, which involves first protecting the polymers to be crosslinked by introducing tert-butoxycarbonyl groups, and in which crosslinking takes place only after the deprotection, by thermal treatment of the now deprotected polyacrylates.

The introduction of the protective groups here serves to prevent the crosslinking reaction, which is not required until later, when there are already high process temperatures during earlier processing stages, as is the case in the hotmelt process, for example. Protection is aimed in particular at the crosslinking reaction at this point in time, but also at all other competing reactions which would attack the unprotected functional groups of the polymer to be processed, especially its hydroxide groups.

Competing reactions in this context include not only reactions initiated and/or promoted by thermal energy but also all reactions which are initiated and/or promoted by other forms of energy and can be avoided by introducing the protective group.

A particularly advantageous procedure is to add additional crosslinker substances to the polymer mixture that is to be crosslinked, prior to the crosslinking reaction. Suitable crosslinker substances in this context are difunctional or polyfunctional isocyanates or difunctional or polyfunctional epoxides. However, it is also possible here to use all other difunctional or polyfunctional compounds familiar to the skilled worker and capable of crosslinking polyacrylates.

The invention provides, moreover, for the use of the polyacrylate as a pressure-sensitive adhesive composition, in particular its use as a pressure-sensitive adhesive composition for an adhesive tape, where the acrylic pressure-sensitive adhesive composition is present as a single- or double-sided film on a backing sheet.

Backing materials that may be used, for adhesive tapes, for example, are materials customary and familiar to the skilled worker, such as sheets (polyester, PET, PE, PP, BOPP, PVC), nonwovens, wovens and woven sheets, and also release paper, if appropriate. This list is not intended to be conclusive.

Figure 1:
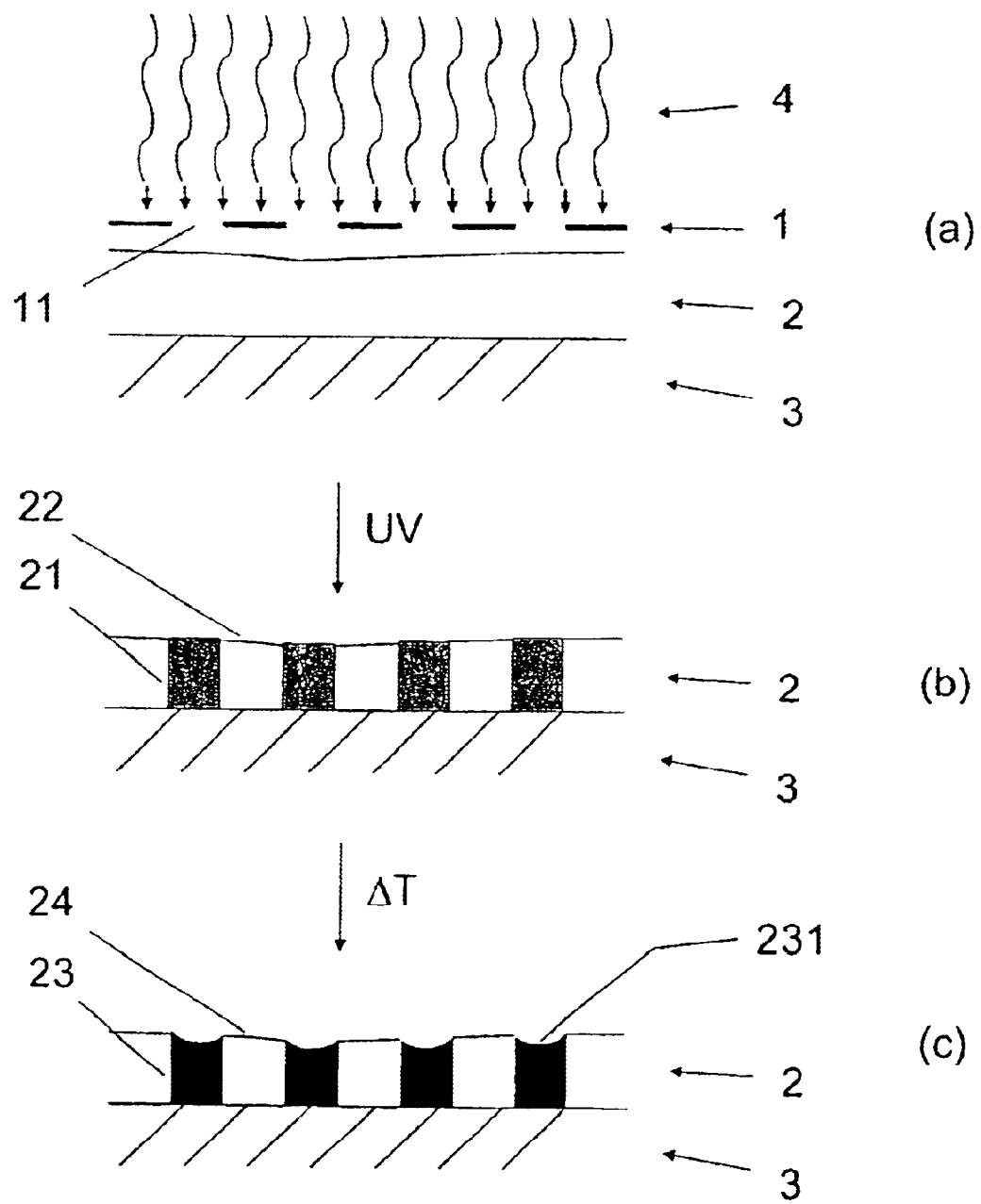
FIG. 1 shows a schematic view of the irradiation of the acrylic composition.

The general reaction principle for the crosslinking reaction controlled by introducing BOC protective groups is described as follows:

The crosslinking of the polymer mixture takes place as a result of two reactions which proceed in succession. In the first step, a BOC-functionalized polymer is prepared. A relatively simple possibility for this is provided by a polymer-analogous reaction, i.e., by a reaction on the macromolecules which modifies the chemical composition but does not significantly alter the degree of polymerization. Reactions occurring at this stage, caused by the production process, do not attack the protected hydroxide groups.

The polymer, now containing BOC groups, is then deprotected by an acid-catalyzed reaction, the BOC groups being converted to the free hydroxyl group:

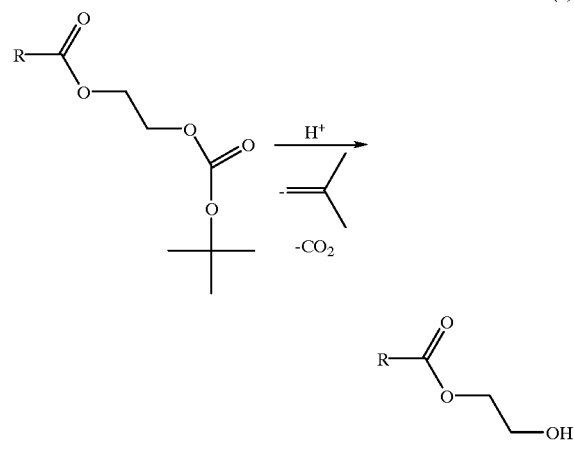

(1)

This reaction is also used in photoresist technology (photoresists: light-sensitive, film forming materials whose solubility behavior alters by exposure to light or other radiation; in the case of negatively working photoresists, this takes place by means of crosslinking or photopolymerization) for the production of chip structures. The acid required for this process is produced by the UV irradiation of an admixed photocationic initiator.

In the second step, the hydroxyl functions are utilized for reaction with a crosslinker. In general, a distinction may be made between two reactions:

a) Reaction with isocyanates as crosslinkers b) Reaction with epoxides as crosslinkers The reaction with isocyanates proceeds without the influence of acid, at elevated temperatures.

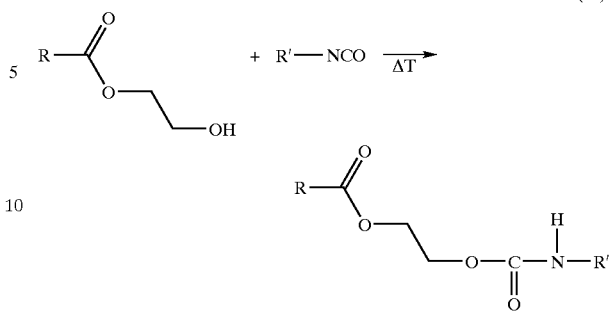

(2a)

In contrast, the reaction with epoxides takes place only with acid catalysis. Here as well, it is necessary to supply thermal energy.

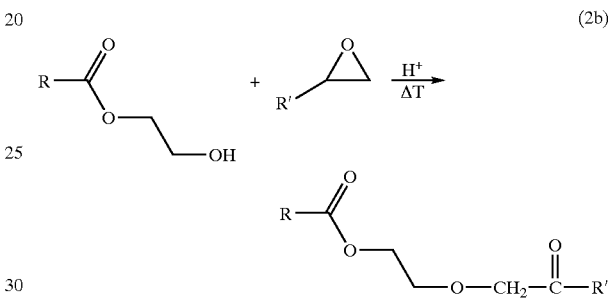

(2b)

If, then, these reaction sequences are transferred to PSA compositions, at least the base polymers must include BOC functions. Hydroxyl-containing polymers, which may be prepared conventionally, for example, by way of a free radical polymerization, are then reacted in a polymer-analogous reaction with BOC anhydride, thereby giving the BOC-protected polymers. Both the base polymers and the polymers provided with BOC groups have the characteristic of a low viscosity. The flow viscosity of the uncrosslinked BOC-containing PSA compositions is relatively low since there are virtually no polar comonomers present which might develop pronounced hydrogen bonds. At this stage, therefore, the processability of the polymer composition in the hotmelt process is very good.

After processing and the addition of UV-cationic initiators and also diisocyanates or diepoxides, and/or polyfunctional isocyanates or polyfunctional epoxides, as crosslinker reagents, the mixture of components is subsequently applied as a hotmelt PSA to a backing (for example, polyester, PVC, nonwoven, BOPP) or to release paper, in the form of a thin film, application taking place by way of a coating nozzle, for example, and is irradiated with UV light (for example, Hg low-pressure lamp or emission sources). In this case, reaction (1) takes place: because of the photocationic initiator, an acid is formed which reacts with the BOC group to give the free hydroxyl function. This reaction takes place at temperatures >100° C. The preferred optimum is a range between 120 and 140° C. The thermal liberation of the hydroxyl function means that there are now reactive groups available for the polyfunctional crosslinkers, so that reactions (2a) and, respectively, (2b) take place: at these temperatures, the isocyanates react directly with the resultant hydroxyl functions and crosslink the PSA composition on the backing. The protons required for crosslinking with the polyfunctional epoxides are present because of the acid generated by the photocationic initiator. Consequently, crosslinking with the polyfunctional epoxides also takes place in situ.

Crosslinking with isocyanates forms amide groups which link the polymer chains. As a result of the linkage, there is an increase in the cohesion of the adhesive composition and hence also in the shear strength. Similar comments apply to crosslinking by way of epoxides, for the ether groups formed.

The physical properties of the end product, especially its viscosity, bond strength and tack, may be influenced by the degree of crosslinking, so that through a suitable choice of the reaction conditions it is possible to optimize the end product. By a selective irradiation of the acrylic PSA composition—that is, irradiation only in selected regions—and/or by local variation in the intensity of irradiation, it is possible to remove the BOC protective groups only at selected sites of the PSA composition. Accordingly, only those regions previously exposed to UV radiation are available for the subsequent crosslinking reaction, for which the presence of polar groups is a prerequisite. In the crosslinking step it is possible as a result to produce highly crosslinked segments alongside segments with little or no crosslinking. The selection of regions exposed to high radiation intensity alongside those having undergone no irradiation or just low-intensity radiation can be effected by irradiation through a mask; useful for this purpose is, in particular, a lattice or a perforated mask, which is pervious only locally for the radiation, or alternatively an embossed film which has a nonhomogeneous thickness and/or density and which therefore has zones of different permeability for ultraviolet radiation.

FIG. 1 depicts the irradiation of the acrylic composition (2) through a perforated mask (1), the acrylic composition (2) being located on the backing (3) (a). The initially polar groups of the acrylic composition (2) have been converted into nonpolar groups in accordance with the main claim, by introduction of BOC protective groups; by means of UV light (4) and at high temperatures (>80° C.), these groups are converted back into polar acrylic acid groups. The ultraviolet rays (4) are able to penetrate the mask (1) only in the region of the perforations (11), so that, following irradiation, the situation is as depicted in Section (b) of the figure:

Polar groups are present only in certain regions (21) of the acrylic composition (2); alongside them there are other regions (22) in which there are still only nonpolar functions, protected by BOC groups.

If the acrylic PSA composition is then heated, a crosslinking reaction occurs only in the polar regions (23) as a result of hydrogen interactions between the polar groups, with the consequence that these regions (23) are distinguished by a high level of hardness while the nonpolar regions (24) possess a relatively low viscosity (c).

A further effect is the release of isobutene gas and carbon dioxide at the crosslinking sites. This reaction results in a decrease in the molecular weight of the crosslinked regions (23) of the PSA composition (2), and a volume contraction (231) is observed. The film thickness of the acrylic PSA composition (2) becomes lower at the irradiated sites (23); consequently, there is a change in the surface topography of the PSA composition (2) and hence also in the adhesive properties. The contracted regions (231) have a property comparable to that of suction cups, so that the bond strength of the acrylic PSA composition (2) is improved as a result of this "suction cup" effect.

The soft segments (24) result in greater ease of flow of the adhesive composition on the substrate and so likewise increase the bond strength and the tack. Great influence over the adhesive properties is exerted by the percentage fraction of the irradiated surface area, and by the size of the segments produced.

EXAMPLES

The following exemplary experiments are intended to illustrate the invention; it is not intended for the choice of the specified examples to unnecessarily restrict the invention.

Test Methods

The samples were investigated using the following test methods:

Shear Strength (Test A)

A 13 mm wide strip of the adhesive tape was applied to a smooth steel surface which was cleaned three times with acetone and once with isopropanol. The area of application was 20 mm×13 mm (length×width). The adhesive tape was then pressed on to the steel support four times, applying constant pressure. At 70° C., a 0.5 kg weight was fastened to the adhesive tape and a 1 kg weight at room temperature, measurement being made in each case of the time which elapses before the weight falls off.

The measured shear stability times are reported in minutes and correspond to the average of three measurements.

Dynamic Mechanical Analysis, DMA (Test B)

The measurements were conducted with the dynamic stress rheometer instrument from Rheometrics. The mechanical loss factor tan δ was monitored as a function of the frequency in an interval from 0.1 to 100 rad/s at 25° C. The temperature dependency of the loss factor was measured at 10 rad/s in a temperature range from −25° C. to 130° C. All experiments were conducted with parallel plate arrangement.

Sample Preparation

The following text describes the preparation of the starting polymers.

The polymers investigated were prepared conventionally by a free radical polymerization; the average molecular weight was approximately 800,000 g/mol. Hydroxyl-containing polymers were reacted with BOC anhydride in a polymer-analogous reaction. The second component admixed, at 0.1–15 parts by weight, was a UV-cationic initiator. As the third component, the polyfunctional (containing at least two isocyanate or epoxide functions) isocyanates or epoxides are added, at from 0.1 to 5 parts by weight. This mixture of components is subsequently applied as a hotmelt PSA in the form of a film to a backing (for example, polyester, PVC, nonwoven, BOPP) or release paper, using a coating nozzle, for example, and the film is irradiated with UV light (for example, Hg low-pressure lamp or emission radiator).

Introduction of the Protective Function

For the introduction of the BOC groups into the base polymers, the following monomers were incorporated into the polymer conventionally by means of radical polymerization:

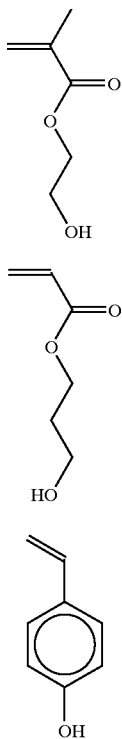

HEMA=hydroxyethyl methacrylate
HPA=hydroxypropyl acrylate
4-HS=4-hydroxystyrene

Example 1

A 2 L glass reactor conventional for radical polymerizations was filled with 40 g of HEMA, 40 g of methyl acrylate, 320 g of 2-ethylhexyl acrylate and 300 g of acetone/isopropanol (97:3). Following the passing of nitrogen gas through the reactor for 45 minutes, with stirring, the reactor was heated to 58° C. and 0.4 g of AIBN [2,2'-azobis(2-methylbutyronitrile)] was added. Subsequently, the external heating bath was heated to 75° C. and the reaction was carried out constantly at this external temperature. The mixture was diluted after 4 and 6 h with 150 g in each case of the acetone/isopropanol mixture. After a reaction time of 48 h, the polymerization was terminated and the mixture cooled to room temperature.

Example 2

The procedure was like that of Example 1. For the polymerization, 40 g of HPA, 80 g of methyl acrylate and 280 g of 2-ethylhexyl acrylate were used. The solvent amounts were retained.

Example 3

The procedure was like that of Example 1. For the polymerization, 40 g of 4-hydroxystyrene, 60 g of methyl acrylate and 300 g of 2-ethylhexyl acrylate were used. The solvent amounts were retained.

The resulting polymers are summarized in Table 1.

TABLE 1

| Example | HEMA [%] | 2-EHA [%] | HPA [%] | MA [%] | 4-HS [%] |
|---|---|---|---|---|---|
| 1 | 10 | 80 | 0 | 10 | 0 |
| 2 | 0 | 70 | 10 | 20 | 0 |
| 3 | 0 | 75 | 0 | 15 | 10 |

HEMA = hydroxyethyl methacrylate
2-EHA = 2-ethylhexyl acrylate
HPA = hydroxypropyl acrylate
MA = methyl acrylate
4-HS = 4-hydroxystyrene Subsequently, polymers 1–3 were protected in a polymer-analogous reaction. Suitable reactions comprise that of di-tert-butyl dicarbonate with catalytic amounts of N,N-dimethylaminopyridine, or the reaction with tert-butyl chloroformate, with deprotonation by sodium hydride beforehand.

a) Polymer-analogous reaction with di-tert-butyl dicarbonate

The polymers from Examples 1–3 (100 g in each case) were dissolved in an acetone/toluene mixture (500 ml) and 1.2 equivalents of di-tert-butyl dicarbonate (based on the number of hydroxyl groups), dissolved in 150 ml of toluene, were added with stirring. After 24 h, the reaction was terminated and the solvents were removed under reduced pressure.

b) Polymer-analogous reaction with tert-butyl chloroformate

The polymers from Examples 1–3 (200 g in each case) were dried under reduced pressure and then dissolved in 500 ml of toluene. 1 equivalent of NaH (based on the number of hydroxyl groups) was added under argon and with stirring. After a reaction time of 60 minutes, 1.5 equivalents of tert-butyl chloroformate were added dropwise and the reaction was heated at 80° C. for 24 h. After cooling to room temperature, aqueous ammonium chloride solution was added, the organic phase was extracted a number of times with aqueous solution, and the polymer was dried at 60° C. for 24 h.

c) Reaction of the monomers with di-tert-butyl dicarbonate

The monomers HEMA, HPA or 4-HS were dissolved in THF, and 1.2 equivalents of di-tert-butyl dicarbonate (based on the number of hydroxyl groups) were added with stirring. After 24 h, the reaction was terminated and the solvent was removed under reduced pressure. The BOC-protected products were purified by distillation.

The reaction caused no change in the comonomer composition; only the hydroxyl groups were BOC protected. The resultant protected compounds are referred to below as 1-BOC (from Example 1 and BOC), 2-BOC (from Example 2 and BOC), and 3-BOC (from Example 3 and BOC).

Alternatively, the Examples 1-BOC to 3-BOC may be prepared by polymerizing the BOC-protected monomers:

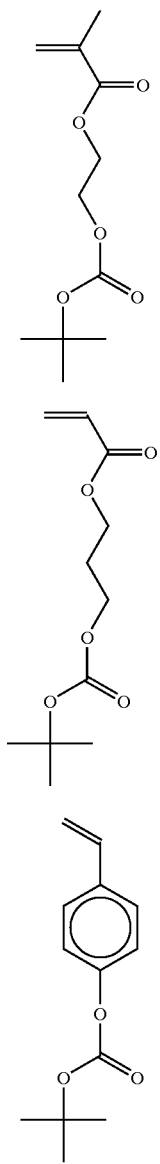

1-BOC

2-BOC

3-BOC

To test the suitability for the hotmelt technology, the PSA compositions were analyzed by DMA. Examples are given in FIG. 2 (flow viscosity at 130° C. of 1-BOC) and FIG. 3 (DMA measurement of 1-BOC, temperature sweep at 10 rad/s).

Figure 2:
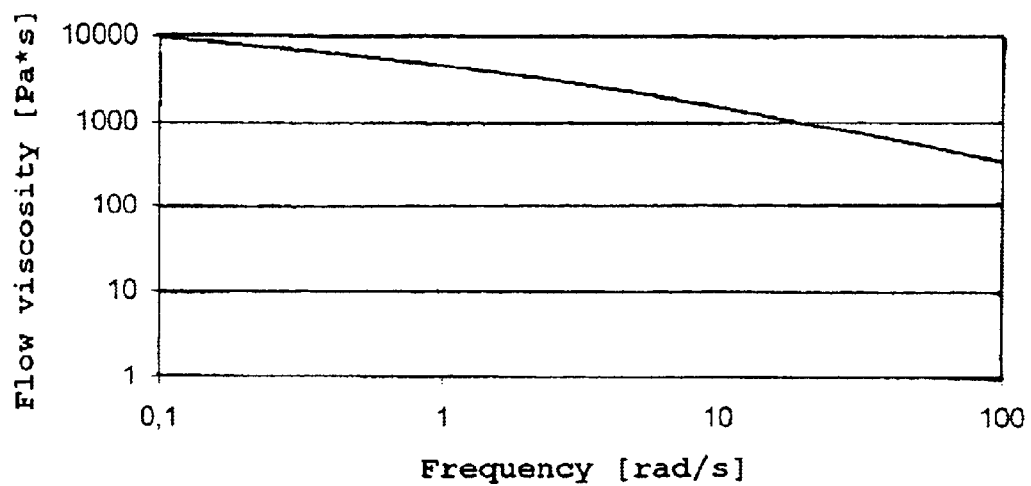
FIG. 2 shows a flow viscosity of 1-BOC at 130° C.
Figure 3:
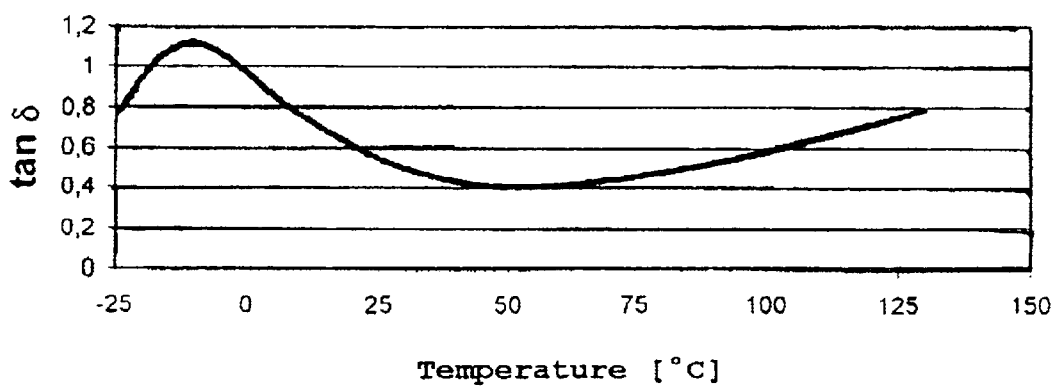
FIG. 3 shows a DMA measurement of 1-BOC at a temperatures sweep of 10 rad/s

From the maximum in FIG. 2 it is possible to derive the dynamic glass transition point ($T_g$), which for 1-BOC is approximately −10° C. From FIG. 1, the flow viscosity at 130° C. was determined. Processing temperatures of more than 100° C. are customary temperatures for the hotmelt process, and so PSA compositions are required which possess a relatively low flow viscosity at these temperatures. The flow viscosity measured for 1-BOC (diagram 1) is in the range of 1000–5000 Pa*s at 1 rad/s, and so this material lends itself very well to processing in an extruder.

Crosslinking of the Samples

Example 1va 100 g of the adhesive composition 1-BOC (50% strength solution) were mixed with 2 g of triarylsulfonium hexafluorophosphate (Cyracure UVI-6990® [UNION CARBIDE]; 50% strength solution) and 1 g of aromatic polyisocyanate (Desmodur L75® [BAYER AG]). Following homogenization (removal of the solvent), the adhesive composition was coated on to release paper (siliconized paper), irradiated with UV light for 60 seconds and heated at 120° C. for 10 minutes. UV irradiation was carried out using the xenon chloride lamp (VIB 308 bulb [FUSION]). The composition was then subjected to adhesive testing.

Example 2va 100 g of the adhesive composition 2-BOC (50% strength solution) were mixed with 2 g of triarylsulfonium hexafluorophosphate (Cyracure UVI-6990® [UNION CARBIDE]; 50% strength solution) and 1 g of aromatic polyisocyanate (Desmodur L75® [BAYER AG]). Following homogenization (removal of the solvent), the adhesive composition was coated on to release paper (siliconized paper), irradiated with UV light with a wavelength of 308 nm for 60 seconds and heated at 120° C. for 10 minutes. UV irradiation was carried out using the xenon chloride lamp (VIB 308 bulb [FUSION]). The composition was then subjected to adhesive testing.

Example 3va 100 g of the adhesive composition 3-BOC (50% strength solution) were mixed with 2 g of triarylsulfonium hexafluorophosphate (Cyracure UVI-6990® [UNION CARBIDE]; 50% strength solution) and 1 g of aromatic polyisocyanate (Desmodur L75® [BAYER AG]). Following homogenization (removal of the solvent), the adhesive composition was coated on to release paper (siliconized paper), irradiated with UV light with a wavelength of 308 nm for 60 seconds and heated at 120° C. for 10 minutes. UV irradiation was carried out using the xenon chloride lamp (VIB 308 bulb [FUSION]). The composition was then subjected to adhesive testing.

Example 1vb 100 g of the adhesive composition 1-BOC (50% strength solution) were mixed with 2 g of triarylsulfonium hexafluorophosphate (Cyracure UVI-6990® [UNION CARBIDE]; 50% strength solution) and 1 g of bisepoxidized bisphenol A (Rütapox 164® [BAKELITE AG]). Following homogenization (removal of the solvent), the adhesive composition was coated on to release paper (siliconized paper), irradiated with UV light with a wavelength of 308 nm for 60 seconds and heated at 120° C. for 10 minutes. UV irradiation was carried out using the xenon chloride lamp (VIB 308 bulb [FUSION]). The composition was then subjected to adhesive testing.

Example 2vb 100 g of the adhesive composition 2-BOC (50% strength solution) were mixed with 2 g of triarylsulfonium hexafluorophosphate (Cyracure UVI-6990® [UNION CARBIDE]; 50% strength solution) and 1 g of bisepoxidized bisphenol A (Rütapox 164® [BAKELITE AG]). Following homogenization (removal of the solvent), the adhesive composition was coated on to release paper (siliconized paper), irradiated with UV light with a wavelength of 308 nm for 60 seconds and heated at 120° C. for 10 minutes. UV irradiation was carried out using the xenon chloride lamp (VIB 308 bulb [FUSION]). The composition was then subjected to adhesive testing.

Example 3vb 100 g of the adhesive composition 3-BOC (50% strength solution) were mixed with 2 g of triarylsulfonium hexafluorophosphate (Cyracure UVI-6990® [UNION CARBIDE]; 50% strength solution) and 1 g of bisepoxidized bisphenol A (Rütapox 164® [BAKELITE AG]). Following homogenization (removal of the solvent), the adhesive composition was coated on to release paper (siliconized paper), irradiated with UV light with a wavelength of 308 nm for 60 seconds and heated at 120° C. for 10 minutes. UV irradiation was carried out using the xenon chloride lamp (VIB 308 bulb [FUSION]). The composition was then subjected to adhesive testing.

Figure 4:
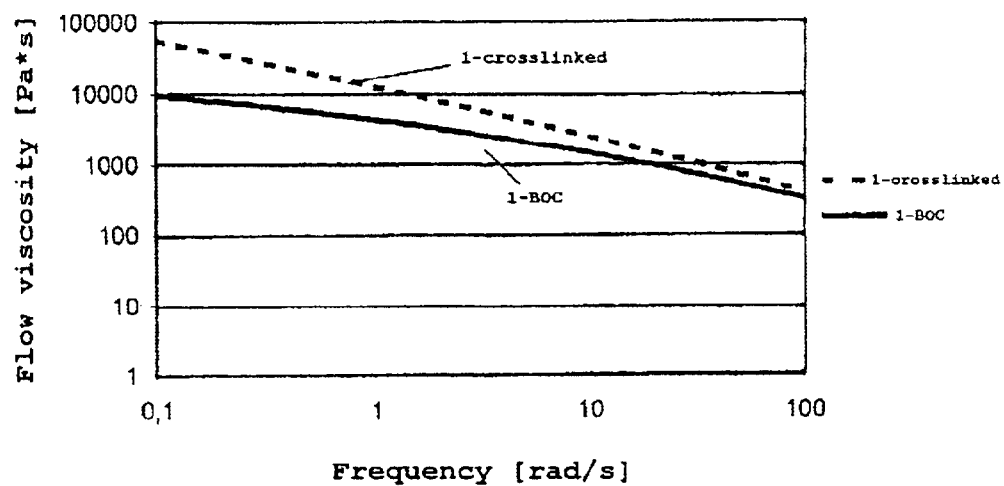
FIG. 4 shows a flow viscosity as compared between 1-BOC and 1va.
Figure 5:
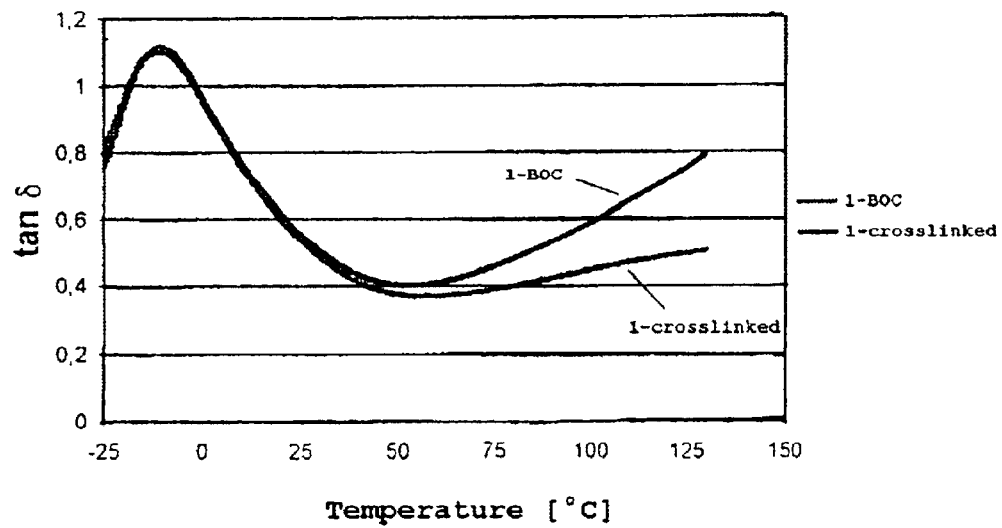
FIG. 5 shows a DMA measurement as compared between 1-BOC and 1va.

UV-initiated thermal crosslinking with the aromatic polyisocyanate (Desmodur L75® [BAYER AG]) caused a distinct rise in flow viscosity (FIG. 4 flow viscosity at 130° C. Comparison of 1-BOC with 1va). This is a clear indication of an increase in cohesion and thus of crosslinking having taken place on the backing. Furthermore, a temperature-dependent DMA measurement was again used to determine the glass transition temperature of 1va, which was compared with the uncrosslinked starting material 1-BOC (FIG. 5 temperature sweep at 10 rad/s. Comparison of 1-BOC with 1va).

The difference in the dynamic glass transition temperature is extremely low. In contrast, the mechanical loss factor tan δ is altered at higher temperatures. For the crosslinked polyacrylate, the plot is significantly flatter, which again points to efficient crosslinking.

In order to investigate the effect of the crosslinking on the adhesive properties, the thermally crosslinked hotmelts were tested in comparison to the starting polymers. The results are listed in Table 2:

TABLE 2

| Example | SST 10 N, RT [min] | SST 5 N, 70° C. [min] |
|---------|--------------------|-----------------------|
| 1-BOC   | 50                 | 40                    |
| 2-BOC   | 75                 | 40                    |
| 3-BOC   | 110                | 50                    |
| 1va     | 1940               | 1205                  |
| 2va     | 2150               | 1180                  |
| 3va     | 3475               | 2030                  |

1va, 2va, 3va crosslinked with aromatic polyisocyanate Desmodur L75® [BAYER AG]SST: Shear stability times From Table 2 it can be seen that the crosslinking significantly improves the cohesion of the PSA compositions. Comparing Examples 1-BOC and 1va, it is noted that the shear stability time increases from 50 to 1940 minutes at room temperature and from 40 to 1205 minutes at 70° C. The same trend is found for Examples 2 and 3 and, correspondingly, 2va and 3va as well.

Crosslinking with difunctional and polyfunctional epoxides was also investigated experimentally. The adhesive compositions 1-BOC, 2-BOC and 3-BOC were mixed—in analogy to the isocyanate crosslinkers—with 1 part by weight of epoxide crosslinker and 2 parts by weight of triarylsulfonium hexafluorophosphate (Cyracure UVI-6990® [UNION CARBIDE]) in solution, the solvent was evaporated and the adhesive compositions were applied as hotmelts to a backing coated with adhesion promoter. Subsequently, under the same conditions as for the isocyanate crosslinking, the systems were irradiated with UV light, but then heated for a period of 20 minutes.

Again, as the results in Table 3 show, the thermal crosslinking reaction causes an increase in the cohesion of the composition and thus also in the shear strength.

TABLE 3

| Example | SST 10 N, RT [min] | SST 5 N, 70° C. [min] |
|---------|--------------------|-----------------------|
| 1-BOC   | 50                 | 40                    |
| 2-BOC   | 75                 | 40                    |
| 3-BOC   | 110                | 50                    |
| 1vb     | 1560               | 950                   |
| 2vb     | 2340               | 1380                  |
| 3vb     | 3125               | 2120                  |

1vb, 2vb, 3vb crosslinked with bisepoxidized bisphenol A (Rütapox 164® [BAKELITE AG]) SST: Shear stability times For the crosslinked Examples 1vb, 2vb and 3vb, increased cohesion relative to the starting polymer was likewise measured. The shear stability times went up markedly. For example, in Example 2vb, the shear stability time rose from 75 to 2340 minutes at room temperature and from 40 to 1380 minutes at 70° C. Nevertheless, the specimens produced with different crosslinkers do diverge in terms of shear strength. Thus Example 1-BOC, for instance, when crosslinked thermally with the aromatic polyisocyanate (1va), held out for 1940 minutes, the product crosslinked with the diepoxide (1vb) only 1560 minutes. This can be explained by the different molecular weight of the crosslinkers and thus also the different network arc length of the crosslinking.

In general, there is no damage to the backing with any of the UV-initiated thermal crosslinkings of the hotmelts. Accordingly, the PSA tapes produced can be used to very good effect as transfer tapes for double-sided bonding. The backings or release papers are not altered or destroyed by ionizing radiation.

What is claimed is:

1. A polyacrylate obtained by thermal crosslinking of a polymer mixture comprising the following components:
   a) a polyacrylate copolymer of the following monomers
      i) acrylates and/or methacrylates of the following formula $CH_2=CH(R^1)(COOR^2)$, where $R^1$=H or $CH_3$ and $R^2$ is an alkyl chain with 1–20 carbon atoms, at 65–99% by weight, based on a),
      ii) olefinically unsaturated monomers containing functional groups, at 0–15% by weight, based on a),
      iii) acrylates and/or methacrylates whose alcohol component contains tert-butoxycarbonyl (BOC) or a combination of tert-butoxycarbonyl (BOC) and hydroxyl groups, at 1–20% by weight, based on a),
      at 80–99.8% by weight, based on the polymer mixture,
   b) a polymerization regulating photoinitiator at 0.1–15% by weight, based on the polymer mixture,
   c) difunctional isocyanata and/or bifunctional epoxide at 0.1–5% by weight based on the polymer mixture.

2. The polyacrylate as claimed in claim 1, wherein component b) is used at 0.5–1.5% by weight, based on the polymer mixture, and/or component c) is used at 0.5–1% by weight, based on the polymer mixture.

3. A process for preparing a crosslinked polyacrylate according to claim 1, wherein the polymers to be crosslinked are first protected by introduction of tert-butoxycarbonyl groups and the crosslinking takes place only after deprotecting with a polymerization regulating photoinitiator, by thermal treatment of the now deprotected polyacrylates.

4. A process for preparing a crosslinked polyacrylate according to claim 1, wherein the polymers to be crosslinked are first protected by introduction of tert-butoxycarbonyl groups and the crosslinking takes place only after deprotecting with a polymerization regulating photoinitiator, by adding crosslinker substances and by thermal treatment of the now deprotected polyacrylates.

5. A process for preparing a crosslinked polyacrylate according to claim 1, wherein the polymers to be crosslinked are first protected by introduction of tert-butoxycarbonyl groups and the crosslinking takes place only after deprotecting with a polymerization regulating photoinitiator, by adding difunctional or polyfunctional isocyanates and by thermal treatment at the now deprotected polyacrylates.

6. A process for preparing crosslinked polyacrylate according to claim 1, wherein the polymers to be crosslinked are first protected by introduction of tert-butoxycarbonyl groups and the crosslinking takes place only after deprotecting with a polymerization regulating photoinitiator, by adding difunctional or polyfunctional epoxides and by thermal treatment of the now deprotected polyacrylates.

7. The process as claimed in one of claims 3–6 wherein the protective groups are eliminated by irradiation with UV light.

8. The process as claimed in claim 7, wherein to eliminate the protective groups the polymer mixture is irradiated with ultraviolet light through a mask in such a way that only certain region of the polymer mixture are exposed to the UV radiation.

9. A pressure-sensitive adhesive composition comprising a polyacrylate according to claim 1.

10. An Adhesive tape comprising a backing and a pressure-sensitive adhesive composition according to claim 9 present as film adhered to one or both sides of said backing.

* * * * *

UNITED STATES PATENT AND TRADEMARK OFFICE
CERTIFICATE OF CORRECTION

PATENT NO.         : 6,875,506 B2
APPLICATION NO.    : 09/778165
DATED              : April 5, 2005
INVENTOR(S)        : Husemann et al.

Page 1 of 1

It is certified that error appears in the above-identified patent and that said Letters Patent is hereby corrected as shown below:

Column 12, Line 60, "isocyanata" should read -- isocyanate --

Column 13, Line 19, "preparing crosslinked" should read -- preparing a crosslinked --

Column 14, Line 11, "certain region" should read -- certain regions --

Column 14, Line 15, "An Adhesive" should read -- An adhesive --

Signed and Sealed this

Fifth Day of June, 2007

JON W. DUDAS
*Director of the United States Patent and Trademark Office*